United States Patent [19]

Wolde-Michael

[11] 4,366,058

[45] Dec. 28, 1982

[54] HIGH EFFICIENCY SETTLING SYSTEM

[75] Inventor: Girma Wolde-Michael, Little Canada, Minn.

[73] Assignee: Donaldson Company, Inc., Minneapolis, Minn.

[21] Appl. No.: 269,623

[22] Filed: Jun. 2, 1981

[51] Int. Cl.³ .............................................. B01D 21/24
[52] U.S. Cl. ..................................... 210/519; 210/320; 210/456; 210/526
[58] Field of Search ............... 210/320, 456, 519, 521, 210/522, 526

[56] References Cited

U.S. PATENT DOCUMENTS

| | | | |
|---|---|---|---|
| 828,515 | 8/1906 | Schmidt | 210/519 |
| 2,118,157 | 5/1938 | Camp | 210/526 X |
| 2,588,233 | 3/1952 | Hapman | 210/526 X |
| 2,999,597 | 9/1961 | Harms | 210/526 X |
| 3,015,621 | 1/1962 | Quast | 210/519 X |
| 3,182,799 | 5/1965 | Krofta | 210/521 X |
| 3,221,889 | 12/1965 | Hirsch | 210/519 X |
| 3,300,047 | 1/1967 | Hirsch | 210/519 X |
| 3,456,798 | 7/1969 | Urdanoff | 210/519 X |
| 3,592,205 | 7/1971 | Sheppard | 134/104 |
| 3,674,145 | 7/1972 | Schmutzler et al. | 210/526 X |
| 3,933,654 | 1/1976 | Middelbeek | 210/521 |
| 3,999,566 | 12/1976 | Iwata et al. | 210/521 X |
| 4,028,256 | 6/1977 | Pielkenrood | 210/519 |
| 4,059,529 | 11/1977 | McGivern | 210/519 |
| 4,111,805 | 9/1978 | Van Pool et al. | 210/522 X |
| 4,123,365 | 10/1978 | Middelbeek | 210/521 |
| 4,135,530 | 1/1979 | Cheney | 134/60 |

Primary Examiner—Robert H. Spitzer
Attorney, Agent, or Firm—Merchant, Gould, Smith, Edell, Welter & Schmidt

[57] ABSTRACT

In an apparatus for settling solid particulate matter apart from a fluid flow, a combination of fluid flow quieteners (30, 40) is provided. One of the fluid flow quieteners (30) includes an inlet baffle (32) having staggered, spaced-apart, generally trapezoidal-shaped openings therein (33), an end plate (35), and channel (36) defined by the inlet baffle (32), the end plate (35), and a side (37) of the tank. Another quietener (40) positioned near the bottom (18) of the tank (10) includes a pair of spaced-apart wall members (43, 44). Arranged between the wall members (43, 44) are a first generally upwardly sloping baffle (45) and a second baffle (46) positioned substantially normal to the first baffle (45). The second baffle (46) has spaced-apart openings (48) therein. A flow rate adjusting means (49) is positioned apart from and generally above the second baffle (46).

15 Claims, 10 Drawing Figures

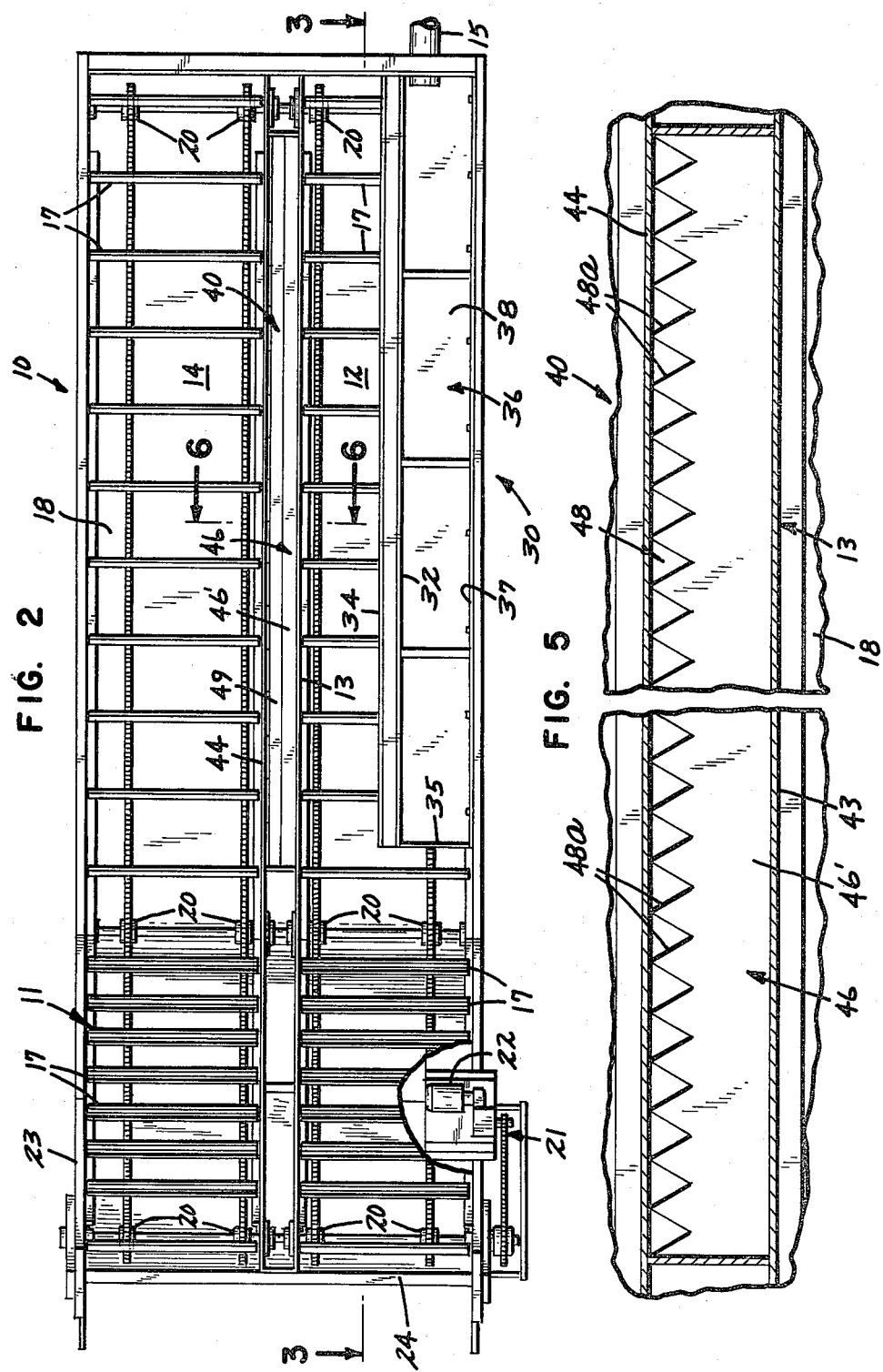

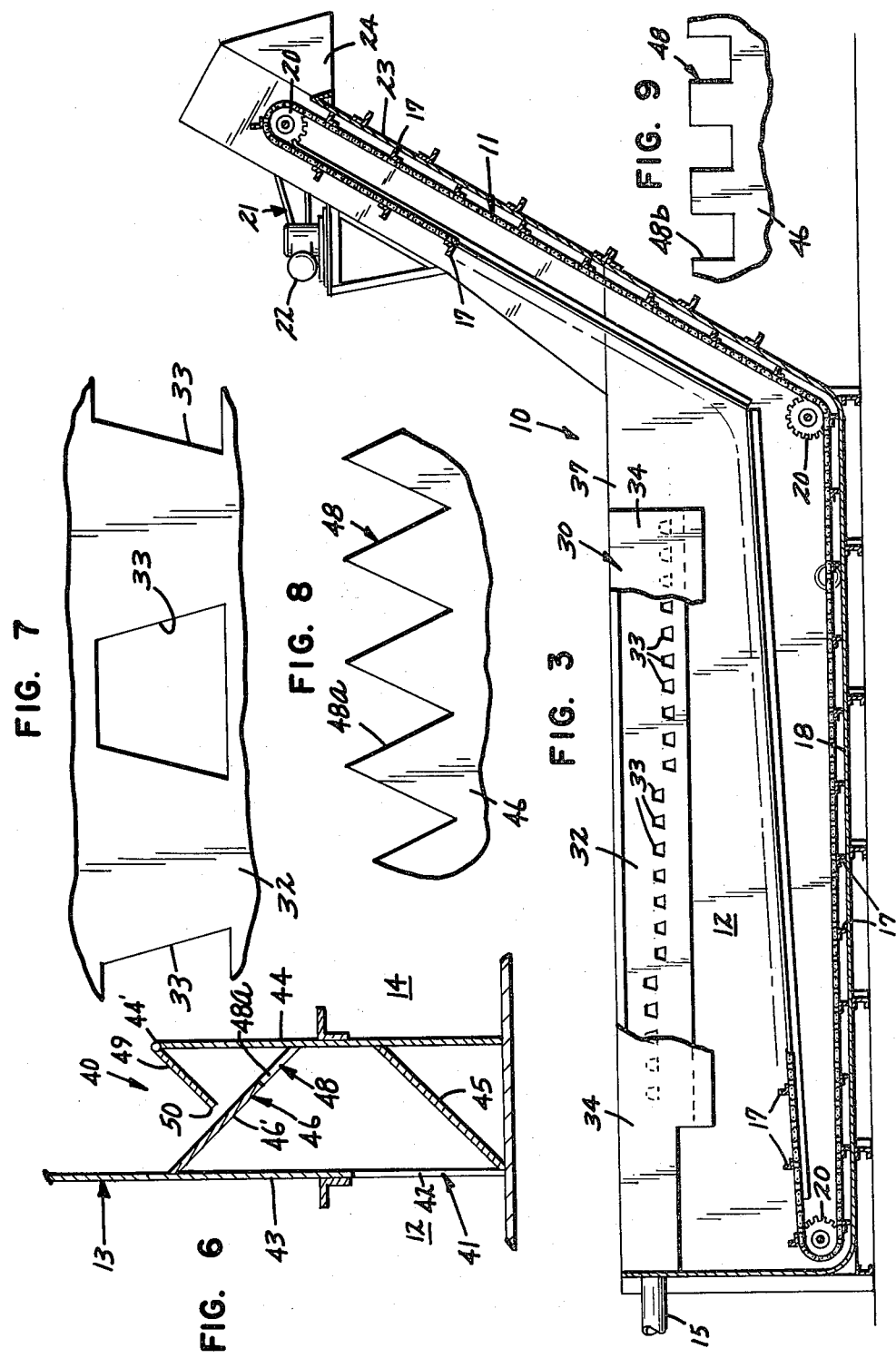

HIGH EFFICIENCY SETTLING SYSTEM

TECHNICAL FIELD

The present invention relates to apparatus used for settling solid particulate matter from a fluid, and more particularly to means within such apparatus for quietening the flow of the fluid at various points in the settling apparatus.

BACKGROUND OF THE INVENTION

Settling tanks and the systems they are employed in are generally well known in the art directed at achieving solid particulate separation from a fluid. It is not unusual to find in those tanks and systems a dragout or scraping mechanism which removes the settled particulate matter from the tank's bottom surface.

There are, however, inherent and recurring problems with the use of such tanks and systems. Included in the problems is the achievement of the maximum efficiency possible with the surface area available for the settling process. However, achieving this maximum efficiency is complicated by the fact that entering turbulent contaminated fluid disturbs the settling particles in the fluid which is already contained in the tank. A disturbance of the settling particles causes a longer residence time to be required for the fluid being held in the tank and thus decreases the separation potential of the system.

The preferred embodiment of the invention is directed to use in a settling system having a standard tank and a scraping or dragout mechanism. Incoming contaminated turbulent fluid flow is caused to flow into the primary settling portion of the tank in a more uniform, laminar flow; additionally, clean fluid overflow velocities are reduced, and a final settling area for relatively fine particulate matter is provided apart from the primary settling area. The present invention augments the efficiency of the settling system significantly and increases its performance.

SUMMARY OF THE INVENTION

The present invention is a part of a settling tank for fluid which contains solid particulate matter. The settling tank has an inlet and an outlet for the fluid flowing therethrough. Included in the present invention is a means for transforming entering turbulent flow into a more uniform, laminar flow. Included in this means is an inlet baffle positioned near the tank inlet with portions of the baffle containing openings therein. The openings are generally of trapezoidal shape and are spaced apart along the length of the baffle in a staggered, substantially non-aligned arrangement. Also included in this means is a means for dissipating energy resulting from the transforming of the fluid from the turbulent into the more uniform, laminar flow. The dissipating means is disposed at the end of the inlet baffle opposite the tank inlet and is generally a solid-ended plate arranged normal to the baffle. Further included in the present invention is a means, submerged in the clean fluid reservoir portion of the tank, which quiets the upflow velocity of fluid flowing from the primary settling area into the clean reservoir area. The quieting means includes a pair of spaced-apart, generally sloping baffles with the upper baffle having portions with spaced-apart, symmetrical openings therein. Located above the baffle containing the openings is a flow rate adjusting means. The quietening means causes a fluid to travel in a tortuous path therethrough which thus reduces the upflow velocity of the fluid, controls the flow rate entering the clean reservoir area, and acts as a final settling area for fine particulate matter.

According to one aspect of the present invention, there is provided a structure for creating a more laminar flow in the incoming turbulent fluid flow so as to prevent significant disturbance in the fluid already contained in the settling tank.

According to another aspect of the present invention, there is provided a reduction in fluid upflow velocity from the general settling area of the tank to the clean fluid reservoir area. There is further provided in this aspect of the invention a final settling area for relatively fine particulate matter.

According to yet another aspect of the present invention, a laminar flow generating means in combination with an upflow velocity reducing means provides an augmented efficiency to the settling performance of the standard tank and dragout system used for separating solid particulate from a fluid flow.

These and other aspects and advantages which characterize the present invention are pointed out with particularity in the claims attached hereto and forming a part hereof. However, for a better understanding of the invention, its advantages, and objects attained by its use, reference should be had to the drawings which form a further part hereof, and to the accompanying descriptive disclosure, in which there is illustrated and described a preferred embodiment of the invention.

BRIEF DESCRIPTION OF THE DRAWINGS

FIG. 2 is a top plan view of the present invention and the settling tank;

FIG. 3 is a cross-sectional view of the present invention and the settling tank as seen generally along line 3—3 in FIG. 2;

FIG. 5 is a cross-sectional view of a portion of the present invention as seen generally along line 5—5 in FIG. 4;

FIG. 6 is a cross-sectional view of a portion of the present invention as seen generally along line 6—6 in FIG. 2;

FIG. 7 is a greatly enlarged elevational view of a portion of the present invention;

FIG. 8 is a greatly enlarged elevational view of a portion of the present invention;

FIG. 9 is a greatly enlarged elevational view of a second embodiment of a portion of the present invention.

DESCRIPTION OF THE PREFERRED EMBODIMENT

Figure 1:
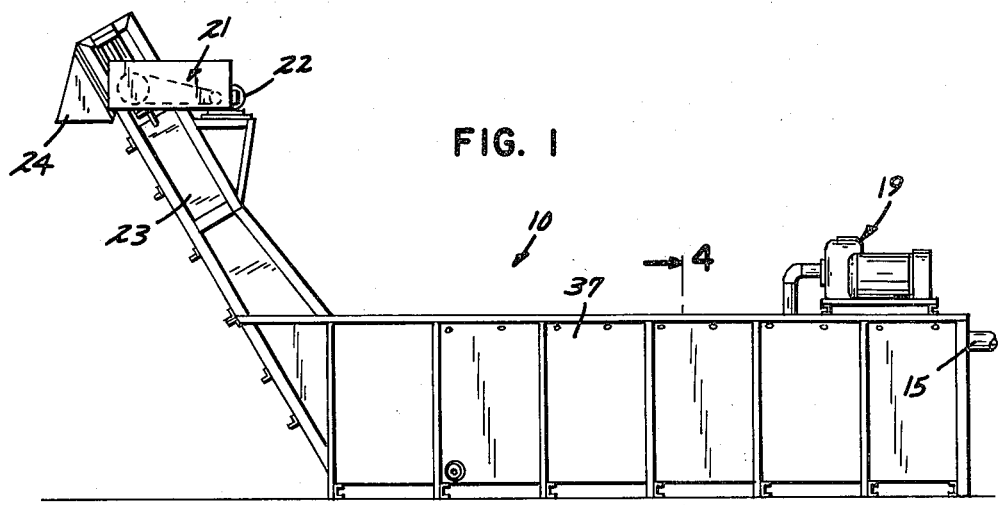
FIG. 1 is a side elevational view of a settling tank used in combination with the present invention.

Referring now to the drawings, wherein like reference numerals are used throughout the several views to indicate the same or similar elements of the invention, it can be seen in FIG. 1 that a standard settling tank 10 is used in combination with a dragout assembly 11, both being well-known in the art. The particular settling tank 10 in this embodiment is designed to be a high-efficiency system having two portions, seen in FIG. 4, a primary settling area 12 which is the "dirty side" of the tank 10, and a clean fluid reservoir area 14 which is the "clean side" of the tank 10. These two areas or portions are separated by a wall member or fluid flow barrier 13. A standard supply pump assembly 19, for transporting clean fluid from the tank 10 back for further operational use, is positioned above the tank 10 to one end as shown in FIG. 1. Fluid is introduced into the tank 10 through an inlet 15 via velocity flumes or gravity drains (not shown). For the most part, the incoming fluid has either critical or supercritical flow characteristics. This will be discussed hereinafter in the operation of the preferred embodiment.

Referring now to FIGS. 2 and 3, it can be seen in the cross-sectional views of the settling tank that the dragout flights 17 of the dragout assembly 11 are positioned and travel along the bottom surface 18 of both portions 12, 14 of the tank 10. Standard sprocket means 20, dragout flights 17, coupling assembly 21, and motor 22 for the dragout assembly 11 are used and are shown only schematically in the drawings. An outwardly projecting solids removal column 23 conveys the settled particulate matter carried by the dragout flights 17 to a discharge chute 24 for disposal purposes.

As stated, the settling tank 10 and dragout assembly 11 combination is a well-known combination in the art. The inventive aspects of the high-efficiency settling tank are a laminar flow generating means indicated generally by the numeral 30, positioned near the tank inlet 15, and an upflow quieting means indicated generally by the numeral 40, submerged in the clean fluid reservoir 14 adjacent the fluid inlet means 41 connecting the primary settling side 12 to the dlean fluid reservoir 14.

The means 30 for transforming the incoming fluid flow into a more uniform, laminar flow, also referred to as a laminar flow generator, includes means for creating the uniform, laminar flow, i.e., an inlet baffle 32 with openings 33, an internal baffle 34, and means for dissipating energy resulting from the transforming of the fluid flow, i.e., an end plate 35.

The positioning of the inlet baffle 32 within the settling tank 10 can be seen most clearly in FIG. 2. It is spaced apart from and extends parallel to a substantial portion of a side 37 of the settling area 12 adjacent the tank inlet 15. In FIG. 3, the side elevational view of the inlet baffle 32 shows a plurality of generally trapezoidal shaped openings 33 which are arranged in descending order from the inlet flow area in a staggered fashion along the length of the baffle 32. In the preferred embodiment, the trapezoidal openings 33 are the same size, but it should be understood that the invention is not limited to the requirement of same size for all of the openings. FIG. 7 shows an enlarged view of the opening shape wherein the wider portion is the lower or bottom portion of the opening.

Figure 4:
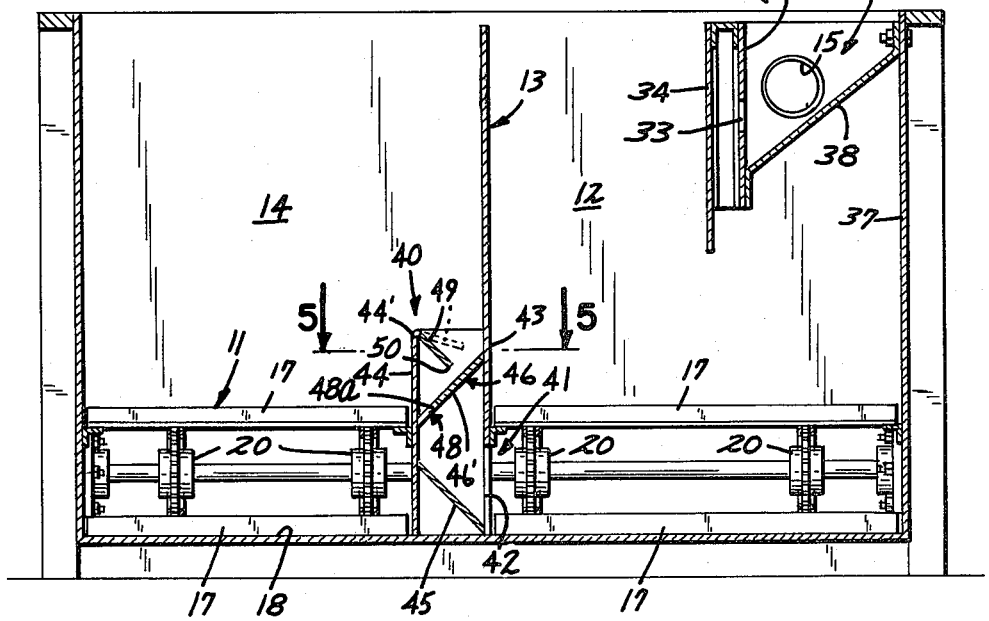
FIG. 4 is a cross-sectional view of the present invention as seen generally along line 4—4 in FIG. 1.

A stationary, internal baffle 34 is spaced apart from the inlet baffle 32 a short distance. As can be seen in FIGS. 2 and 4, the internal baffle 34 is positioned so as to locate the inlet baffle 32 between it and the tank inlet 15. The internal baffle 34 extends a short distance below the inlet baffle 32, but both baffles terminate together at their connection with the end plate 35 arranged directly opposite the tank inlet 15. See FIG. 2. Referring now to FIG. 4, a bottom wall or channel member 38 is connected to a side 37 of the tank and slopes downwardly from the tank side 37 to a lowermost portion of the inlet baffle 32. Together the end plate 35, the inlet baffle 32, and the bottom wall 38 form a channel or trough-like structure 36 which restricts the flow of entering fluid so as to contain it within the channel 36 prior to its entry into the tank's primary settling area 12. In the preferred embodiment, the tank inlet 15 is located directly opposite the end plate 35 such that entering fluid flows generally parallel to the inlet baffle 32 and directly impacts the end plate 35. It should be understood, however, that the tank inlet 15 could also be placed normal to its preferred location shown in FIG. 4, wherein the incoming fluid has a first direct impact with the inlet baffle 32 and subsequently impacts the end plate 35.

Referring now to FIG. 4, and to FIG. 6, which is a mirror image of the corresponding portion shown in FIG. 4, the upflow quieting means 40 of the present invention is disclosed. This aspect of the invention is a means for quieting the upflow velocity of fluid flow as it flows from the primary settling area 12 into the clean reservoir side 14 of the settling tank 10. The means 40 includes an inlet means 41 connecting the settling area 12 to the clean reservoir area 14, means 45 for preventing suspended particulate matter from being carried with the fluid into the clean side of the tank, and means 43, 44, 46, and 49 for agglomerating the collected particulate matter in order to remove it from the clean portion of the tank. The upflow quieting means 40 is positioned, so as to be submerged, along the bottom 18 of the tank in the clean fluid reservoir portion 14, adjacent the fluid flow barrier 13 which separates the two portions 12, 14.

It can be seen in FIG. 4 that the inlet means 41 is a lowermost portion of the fluid flow barrier 13 with an opening 42 therein. A first wall member 43 is also a portion of the barrier 13 and, together with the bottom surface 18 of the tank 10, defines the inlet opening 42. Spaced apart from this first wall member 43 is a second wall member 44 which extends upwardly from the tank bottom 18 and terminates at a location substantially below the liquid level of the clean reservoir portion 14. Positioned between the first and second wall members 43, 44 is a first generally sloping baffle 45. As can be seen in FIG. 4, and also in FIG. 6, the first baffle 45 extends from a location near the tank bottom 18 and inlet means 41 to a location generally centrally located on the second wall member 44. The first baffle 45 slopes upwardly at approximately a 45° angle and is a solid plate with no openings therein.

Figure 10:
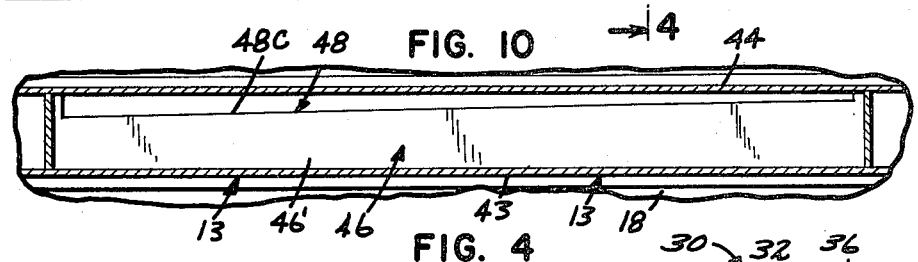
FIG. 10 is an elevational view of a third embodiment of a portion of the present invention.

A second baffle 46 is positioned between the first 43 and second 44 wall members and spaced apart from and above the first baffle 45. The second baffle 46 is a plate 46' positioned to generally slope upwardly at approximately a 45° angle. It extends from a location on the second wall member 44 to a location on the first wall member 43. The baffles 45, 46 are thus positioned substantially normal to each other. As can be seen in FIGS. 5, 8, and 9, the plate 46' has portions spaced apart with openings 48 therein located at the juncture of the second baffle 46 with the second wall member 44. The openings 48 in the preferred embodiment are inverted triangular shapes 48a. However, openings having generally square shapes 48b or a continuous, trapezoidal-shaped opening 48c, as shown in FIGS. 9 and 10, respectively, are used in alternative embodiments. The opening size will depend upon the flow rate and the amount of particulate matter to be separated from the fluid. They are spaced so as to a generate low overflow velocity under various velocity heads.

An adjustable, generally solid plate 49 extends generally downwardly from the uppermost portion 44' of the second wall member 44 and terminates in a free end 50 at a predetermined distance apart from the solid portion 46' of the second baffle 46. This can be seen clearly in FIG. 4 and FIG. 6. The plate 49 is generally positioned at a 45° angle with respect to the vertical so as to lie in a plane which is substantially normal to the plane of the second baffle 46. The plate 49 is constructed so that the angle can be variously adjusted in order to generate the required amount of discharge at a very low velocity differential. It also acts as a vertical separator which will be discussed hereinafter in the operation of the invention.

OPERATION OF THE PREFERRED EMBODIMENT

Contaminated fluid flow is introduced into the settling tank 10 through the tank inlet 15 and arrives in a generally turbulent fluid flow state. Most of the efficiency of any settling tank 10, however, is lost due to unobstructed fluid impact by the entering turbulent fluid flow upon the fluid already being held in the system. It is desired that entering fluid flow be more uniform such that particles already settling will not be unduly disturbed by the continued entrance of new fluid flow. Accomplishing this objective will in turn make the settling surface areas highly efficient and improve the overall settling performance of the tank and system.

In the present invention, the entering turbulent fluid flow initially travels within the channel 36 until it hits the dead end plate 35. It is here that the theories of lateral outflow from channels and their mathematical formulae are applicable to the fluid moving within the channel 36. In velocity or gravity flumes three types of fluid flow are encountered. The first type is a laminar or near-laminar flow for which Froude's number (Fr) is less than 1. The second type is the critical flow with Fr greater than 1. The third type is a combination of the first two types separated by a hydraulic jump. It is generally the third type to which this invention is directed.

When a supercritical flow is introduced into the channel 36, a surge is created accompanied by a hydraulic jump after the flow has impacted the end plate 35. The surging fluid proceeds along the inlet baffle 32 containing the trapezoidal openings 33. As the surging fluid moves in a direction opposite to the incoming fluid, the fluid is transposed approximately 90° before it can exit the channel through the openings 33. The energy resulting from the transforming of the incoming turbulent fluid flow into a more laminar flow is dissipated by three aspects of the invention: the end plate 35, the surge movements of the fluid flow, and the hydraulic jumps within the fluid.

The first or lowest set of trapezoidal openings 33, those nearest the end plate 35, are submerged in the surging fluid and thus handle full fluid flow. As the surge develops, however, it will move against incoming fluid at points of varying depth. Also, due to resulting turbulence at the surge crest, the energy in the surge is less than the energy in incoming fluid at critical flow. Depending upon the flow conditions, surges of different depth will be generated throughout the length of the channel 36. The trapezoidal shape of the openings 33 allows a "slicing" or "skimming" of the fluid flow at the different velocity contours and streamlines. The lower portion of each opening allows significant amounts of fluid therethrough while the upper or more tapered portion of each opening yields a "valving" action by transferring excess fluid flow on to the next higher group of trapezoidal openings. In this manner, turbulent flow at the surge crest is discouraged from overflowing the channel, i.e., overflow is limited due to the tapering horizontal fluid outlet or opening. The surge is directed on to the next group of trapezoidal openings which further "skim" the surging flow and, as a result, lower the velocity of the fluid flow leaving the channel and entering the settling portion 12. This "valving" effect creates a more uniform laminar flow passing through each of the openings 33. The vertical and horizontal orientations of the openings assure a range of flexibility in handling the variable incoming flow conditions.

Once through the trapezoidal openings 33, the flow proceeds on and impacts the internal baffle 34 which further causes a quieting of the fluid flow and directs particulate matter within the fluid flow downwardly toward the bottom surface 18 of the tank 10. This in turn augments the settling process.

The most important aspect of this flow quietener or laminar flow generator is the ability to decrease the impact of incoming turbulent fluid and to dissipate energy such that flow into the tank is more uniform and the settling particles are not unduly disturbed, thus making the settling surfaces highly efficient.

With respect to the submerged, upflow quieting means 40, the most important concept of this aspect is its flexibility to accomodate variable flow conditions depending upon efficiency requirements of the particular operation.

As fluid flow proceeds from the primary settling area 12 through the inlet means 41 on a path into the clean fluid reservoir 14, the first or lower baffle 45 is contacted. The placement of this generally upwardly sloping lower baffle 45 achieves two significant objectives. As the fluid flow contacts it, the baffle 45 allows a further segregation of particles. It is positioned to prevent particulate build up upon it, and it acts as an isolation baffle to encourage incoming particulate matter which has not yet settled to drop back down towards the bottom surface 18 of the primary settling portion 12 for removal by the dragout flights 17. Thus the incoming fluid from the settling portion 12 impacts the first inclined baffle 45 and the suspended particles migrate toward the lower or vertex corner of the baffle where they adhere to the surface, mature, and are carried out of the primary settling portion 12 by the dragout flights 17. Additionally, the baffle 46 and the first wall member 43 have a "siphoning" effect upon the particulate matter carried by fluid flow through the inlet 42. Suspended matter is drawn into the area defined by the baffle 46 and member 43. It adheres, matures, and finally drops downwardly towards the first baffle 45 and ultimately is removed by the dragout flights in the settling portion 12. In this manner, the primary settling portion 12 is further used as much as possible for the settling and removal of relatively large particles.

The most important aspect of this flow quietener 30 is its capacity to decrease clean fluid upflow velocities, to trap floating fine particulate matter, and to augment thereby settling efficiency. The second baffle 46 is a primary discourgement for the upward migration of contaminant particulate matter into the clean fluid reservoir area 14. The design of the baffles 45, 46 discourages "matured" particles from proceeding upwardly by causing them to hit the solid portions between the openings 48, and to thus drop back down toward the tank portion 12 along the first baffle 45. The use of the square openings 48b shown in FIG. 9 is recommended for applications in which spherical or substantially spherical particles are suspended in a fluid. The inverted triangular shapes 48b shown in FIGS. 6 and 8 are best used for chips, steel wool, etc., which are suspended in the fluid. The continuous trapezoidal-shaped opening 48c shown in FIG. 10 is preferred when the suspended particulate matter contains a combination of chips, grindings, spherical-shaped particles, etc. The size and location of the openings is determined by prevailing design considerations and efficiency requirements.

The second reason for this particular design is that a capillary action results in the fluid flow as it proceeds through the openings. The direction of travel of this thin fluid flow tends to be in an upward direction along a substantially vertical vector. The upward movement of the fluid flow causes it to impact the inclined plate 49 which is preadjusted to generate the required amount of discharge into the clean fluid reservoir area 14 at a very low velocity differential. The inclined plate 49 not only controls fluid flow, but is also used as a floating material trap along its lower portion near its free end 50, as well as being a final settling area for fine particulate matter at its more enclosed upper portion. The upper or apex portion of the plate 49, positioned at a 45° angle with respect to the vertical, acts as a strainer for the collection of particles that manage to flow with the fluid through the openings 48 of the second baffle 46. The 45° angle is the preferred angle as it is well known in the art as the angle at which the best adherence of particles to the solid surface will occur when fluid flow is substantially along a vertical vector. As the fluid flows upwardly through the second baffle 46, the particles will collect along the upper apex portion of the angled plate 49. With the decrease in area at this portion of the plate 49 there is an accompanying increase in the velocity of the fluid which in turn causes an undercurrent to flow along that portion. The particles are more or less "strained" from the fluid and adhere to the solid underside surface of the plate 49 as the fluid itself proceeds down the inclined portion and out the opening defined by the end 50 and the second baffle 46. The particles adhering to the plate interior surface agglomerate and "mature" so that their combined weight allows them to disengage from the surface and settle down through the second baffle openings 48 into the primary settling portion 12. In essence, the adjustable plate 49 acts as a final settling area and as an inertial separator by concentrating the agglomerated particulate matter for travel in a downward direction.

A number of characteristics and advantages of the invention have been set forth, together with the structure and operation of the invention. The novel features thereof are pointed out in the following claims. The disclosure is merely illustrative, and changes may be made in detail with respect to shape, size, and structural arrangement within the principle of the invention to the full extent intended by the broad general meaning of terms expressed in the claims.

What is claimed is:

1. In a settling tank for a fluid containing solid particulate matter and having a primary settling area, a fluid flow inlet in said primary settling area, a clean fluid reservoir area adjacent said primary settling area, and fluid inlet means for providing a fluid upflow from said settling area into said reservoir area, means for quietening the fluid flow, including:

means positioned near said inlet for transforming entering turbulent fluid flow into a more uniform, laminar flow, said means including an inlet baffle having portions with spaced apart openings therein, said openings being positioned along the length of said baffle in a staggered, substantially nonaligned arrangement; and means submerged in said clean reservoir area adjacent said fluid inlet means for quieting the fluid upflow velocity, said means including a pair of spaced apart, generally sloping baffles, one of said baffles having portions with spaced apart, symmetrical openings therein, and adjustable flow rate means positioned above said baffles, said upflow quieting means designed and constructed to cause said fluid flow to travel in a tortuous path therethrough.

2. In a settling tank for a fluid containing solid particulate matter, said tank having a bottom surface, a primary settling portion, a fluid flow inlet in said settling portion, and a substantially clean fluid reservoir portion, means submerged in said reservoir portion adjacent said tank bottom surface for quieting the upflow velocity of clean fluid flow from said primary settling portion into said reservoir portion, said means including:

inlet means for allowing fluid flow between said tank portions;

means, adjacent said inlet means, for preventing suspended solid particulate matter from being carried by said fluid from said settling portion into said reservoir portion, said means including at least one baffle positioned in said reservoir portion at said inlet means so that said entering fluid flow from said settling portion impacts said baffle; and means, positioned generally above said preventing means, for agglomerating said particulate matter, said means designed and constructed to allow a maturation of said particulate matter and a subsequent settling out of said particulate matter in a direction towards said settling portion and generally away from said reservoir portion.

3. The fluid upflow quieting means according to claim 2 further including means for adjusting the flow rate of fluid passing through said agglomerating means.

4. The fluid upflow quieting means according to claim 2 wherein said agglomerating means includes a baffle member having at least one opening therein and being disposed above said preventing means baffle.

5. The fluid upflow quieting means according to claim 4 wherein said baffle member includes a plurality of portions each containing a substantially square opening therein.

6. The fluid upflow quieting means according to claim 4 wherein said baffle member includes a plurality of portions each containing a generally triangular-shaped opening therein.

7. The fluid upflow quieting means according to claim 4 wherein said baffle member opening is a substantially continuous trapezoidal-shaped opening which extends across said baffle member.

8. In a settling tank for a fluid containing solid particulate matter, said tank having a primary settling portion, a clean fluid reservoir portion separated from said settling portion by a first wall member, a bottom surface, a fluid flow inlet in said settling portion, means submerged in said reservoir portion along said bottom surface for quieting the upflow velocity of fluid flow from said settling portion into said reservoir portion, said means including:

said first wall member extending upwardly from said tank bottom surface, said member having fluid inlet means, a top end edge, and a bottom end edge, said bottom end edge engaging said tank bottom surface;

a second wall member within said reservoir portion spaced from said first wall member, said second wall member extending upwardly from said tank bottom surface and having an uppermost portion and a bottommost portion, said bottommost portion engaging said tank bottom surface;

a first baffle extending generally upwardly from said first wall member bottom end edge to a generally central location on said second wall member;

a second baffle secured in a position between said wall members above said first baffle, said second baffle extending generally upwardly in a plane substantially normal to the plane of said first baffle, and having at least one opening therein, said fluid inlet means in said first wall member being located between said first and second baffle; and means for adjusting the flow rate of the generally upward fluid flow passing through said second baffle into said reservoir portion, said means including a solid plate extending generally downwardly from said second wall member uppermost portion and pivotally secured thereto, said plate having a free end terminating a distance from said second baffle.

9. The fluid upflow quieting means according to claim 8 wherein said first and second baffles, said flow rate adjusting means, and said wall members are each substantially rectangular in shape and extend substantially across a length of said clean fluid reservoir portion.

10. The quieting means according to claim 9 wherein said second baffle includes a plurality of spaced-apart openings substantially square in shape and disposed near the juncture of said baffle and said second wall member.

11. The quieting means according to claim 9 wherein said second baffle includes a plurality of spaced-apart triangular-shaped openings, said openings being disposed in said second baffle near the juncture of said baffle and said second wall member.

12. The quieting means according to claim 9 wherein said opening is a substantially continuous trapezoidal-shaped opening extending across said second baffle, said opening being disposed in said second baffle near the juncture of said baffle and said second wall member.

13. In a settling tank having a fluid inlet and a fluid containing solid particulate matter entering therefrom, means for transforming incoming turbulent fluid flow into more uniform, laminar flow within said tank, said means being positioned near said tank inlet and including:

means for diverting said fluid flow through an angle of substantially ninety degrees, including an elongated, trough-like structure secured to a side of said tank, said structure having a side wall opposite said tank side and a bottom wall intermediate said tank side and said side wall; and means for dissipating energy resulting from the transforming of said fluid from a turbulent into a more uniform laminar flow, said means including an end plate, positioned generally opposite said tank inlet, forming an end wall of said trough-like structure, said diverting means side wall being a generally rectangular shaped, inlet baffle having portions with spaced apart openings therein, said openings being positioned in a staggered relationship across said baffle with an uppermost opening located nearest said tank inlet and a lowermost opening located nearest said end plate.

14. In a settling tank having a fluid inlet and a fluid containing solid particulate matter entering therefrom, means for transforming incoming turbulent fluid flow into more uniform, laminar flow within said tank, said means being positioned near said tank inlet and including:

means for diverting said fluid flow through an angle of substantially ninety degrees, including an elongated, trough-like structure secured to a side of said tank, said structure having a side wall opposite said tank side and a bottom wall intermediate said tank side and said side wall; and means for dissipating energy resulting from the transforming of said fluid from a turbulent into a more uniform laminar flow, said means including an end plate positioned generally opposite said tank inlet and forming an end wall of said trough-like structure, said diverting means side wall being a generally rectangular shaped, inlet baffle having portions with spaced apart openings therein, said openings being generally trapezoidal in shape and positioned in a staggered relationship across said baffle with an uppermost opening located nearest said tank inlet and a lowermost opening located nearest said end plate.

15. The fluid flow transforming means according to claim 13 or 14 further including an internal, stationary baffle spaced apart a relatively small distance from said inlet baffle, said inlet baffle being fluid impervious and disposed intermediate said tank inlet and said internal baffle.

* * * * *